United States Patent
Kester

[19]

[11] Patent Number: 6,076,935
[45] Date of Patent: Jun. 20, 2000

[54] RAPID ASSEMBLY PHOTOGRAPHIC LIGHTING DOME

[76] Inventor: Eugene A. Kester, 333 Encinal St., Santa Cruz, Calif. 95060

[21] Appl. No.: 09/214,685
[22] PCT Filed: Jun. 3, 1998
[86] PCT No.: PCT/US98/11443
§ 371 Date: Jan. 8, 1999
§ 102(e) Date: Jan. 8, 1999
[87] PCT Pub. No.: WO98/55898
PCT Pub. Date: Dec. 10, 1998

Related U.S. Application Data
[60] Provisional application No. 60/048,955, Jun. 6, 1997.
[51] Int. Cl.[7] .................................................. G03B 15/02
[52] U.S. Cl. ............................... 362/16; 362/16; 362/17; 362/18; 362/3; 362/278; 362/320; 362/360; 362/352; 362/370; 362/371
[58] Field of Search ................................. 362/16, 17, 18, 362/3, 278, 320, 360, 352, 370, 371

[56] References Cited
U.S. PATENT DOCUMENTS
4,446,506  5/1984  Larson .
4,669,031  5/1987  Regester .
5,023,756  6/1991  Regester ..................................... 362/16

*Primary Examiner*—Sandra O'Shea
*Assistant Examiner*—Anabel Ton
*Attorney, Agent, or Firm*—Larry B. Guernsey

[57] ABSTRACT

A photographic lighting dome (10) for holding and directing a light source having a housing (11) of flexible material, the housing (11) having an inner perimeter (12) surrounding a central opening (13), and an outer perimeter (14). There are a plurality of flexible support rods (20), each support rod (20) having a connecting end (24) and a releasable end (26). A central hub (18) having a plurality of support rod attachment fixtures (42) is positioned in the central opening (13) of the housing (11), where each fixture (42) is configured for receiving the connecting end (24) of one of the plurality of support rods (20). A plurality of channels (22) are formed in the housing (11), extending from the housing central opening (13) to the outer perimeter of the housing (14), each channel (22) being shaped to receive one of the plurality of support rods (20). Each channel (22) further has a central channel opening (32), the connecting end (24) of a support rod (20) passing therethrough for attachment to the central hub (18), and an outer perimeter opening (34), through which the releasable end (26) of the support rod (20) may pass. A plurality of retaining means (36) are positioned proximate to the housing outer perimeter (14) for releasably capturing and maintaining axial force in each of said support rods (20) in each of the channels (22) to urge the housing (11) into a dome shape.

A method of assembling and disassembling the photographic dome (10) is also disclosed.

20 Claims, 2 Drawing Sheets

RAPID ASSEMBLY PHOTOGRAPHIC LIGHTING DOME

This application claims priority from U.S. Provisional Application Serial No. 60/048,955 filed Jun. 6, 1997, which has the same inventor as the present application.

TECHNICAL FIELD

The present invention relates generally to illuminators and more particularly to apparatus for providing diffused lighting for photographic purposes. The inventor anticipates that primary application of the present invention will be for location filming and lighting for mobile broadcast journalism. However, the present invention is also well suited to use in studio photography and in broadcast media studios.

BACKGROUND ART

Light diffusion boxes, also known as "softboxes" have long been used by photographers and camera crews to provide diffused lighting on photographic subjects. Softboxes are especially useful for location shooting, because they are generally light-weight and portable. They are generally made collapsible into compact bundles by using flexible material, such as cloth, which has been stretched on a light-weight framework. Their use for location filming of news events by camera crews makes easy and rapid assembly very important. In an environment where several news crews may be competing for coverage of an event, or where an unexpected occurrence makes response time crucial, every second can be valuable to field journalists. The time spent in assembling lighting equipment for the shooting can make the difference in effectiveness and competitive edge.

Unfortunately, prior art softboxes can be clumsy to assemble and often require a large degree of physical strength. The typical softbox has a flexible framework which supports and gives shape to a fabric housing which surrounds a light source. The light source generally must be very bright, from 150–500 watts, and thus also produces a great deal of heat. Safety considerations therefore dictate that the fabric housing be kept well away from the light source, and not allowed to sag toward it. The supporting structure necessarily stretches the fabric tautly, keeping it under tension. The support structure, in collapsible softboxes, is typically composed of rods which are flexible along some portion of their length, and which are captured within seams or channels formed in the fabric housing. The rods are generally inserted into the channels, which extend to the four corners of the fabric, and then the free ends are inserted into sockets around the circumference of a rigid central hub. The insertion sockets are generally straight channels formed into the corners of the hub, into which the free end of the rod is guided. This often requires that the rod be inserted from a very small range of approach angles, in order to get the parts to mate properly. The insertion can be difficult, as it involves applying pressure to force the flexible rods to bend at the same time that the free end is sought to be inserted in the socket in the central hub. This can require a great degree of physical strength, as well as much patience since the flexible rods are generally not designed to be very easily bent, rather to the contrary, because they must exert tension on the fabric housing to insure that it will not sag.

Additionally, the free ends of the support rods sometimes have no sort of cap structure to blunt the edges of the rod end. There is thus possibility of injury, if one of the rods slips while the user is seeking to align it with its insertion socket. If this springy rod with an unblunted edge snaps out straight, this can cause damage to hands, wrists or eyes as the rod can be expected to straighten with considerable force.

U.S. Pat. No. 4,446,506 to Larson discloses a photographic light diffuser with supporting rods which are placed in metal grommeted apertures in the corners of panel segments. Assembly is done by first attaching the outer-most corners, and then attaching the inner-most corners to extending bolts.

U.S. Pat. No. 4,669,031 to Regester illustrates a light box for photographic use having flexible rods which are inserted into corner loops of the side walls of the housing, forcing them to expand into roughly a truncated pyramidal shape. At the large end of the housing, each loop is closed to prevent the rod ends from passing through. This configuration leads to exactly the disadvantages in terms of convenience and safety which are discussed above.

U.S. Pat. No. 5,023,756, also to Regester, shows a light diffusion box with supporting rods which are apparently inserted into the corner edges of a fabric housing, and then connected at the rod's free ends to a central ring structure. As in the previous Regester patent, this configuration has the precise defects which are enumerated above, and which are addressed in the present invention. In addition, the multi-part rods used have ends which are not interchangeable, which slows assembly.

There is thus a need for an improved light diffusing box which is collapsible, and which assembles and disassembles in a rapid, easy and safe manner.

DISCLOSURE OF THE INVENTION

Accordingly, it is an object of the present invention to provide a photographic lighting dome which can be rapidly assembled.

Another object of the present invention is to provide a photographic lighting dome which requires very little physical strength to assemble.

Another object of the present invention is to provide a photographic lighting dome in which application and release of spring tension to the support rods can be done in a safe and controlled manner.

Briefly, one preferred embodiment of the present invention is a photographic lighting dome for holding and directing a light source, the lighting dome having a housing of flexible material. The housing has an inner perimeter surrounding a central opening, and an outer perimeter. The lighting dome also includes a number of flexible support rods, each rod having a connecting end and a releasable end, and a central hub positioned in the central opening of the housing. This hub has a number of support rod attachment fixtures, each fixture configured for receiving the connecting end of one of the support rods. A number of channels are formed in the housing, extending from the housing central opening to the outer perimeter of the housing, each channel being shaped to receive one of the support rods. Each channel has two ends and an opening at each of the ends. There is a central channel opening to allow the connecting end of a support rod to pass through for attachment to the central hub, and an outer perimeter channel opening, through which the releasable end of the support rod passes. A number of retainers are attached near the housing perimeter for releasably capturing the support rods. The axial force is maintained in each of said support rods in the channels while the retainers are fastened, but the rods are controllably released in the direction of the outer perimeter when the retainers are unfastened.

An advantage of the present invention is that the assembly of the photographic lighting dome can be done very rapidly.

Another advantage of the present invention is that the retaining tabs at each corner of the housing can be easily fastened or released while the support rods are under tension.

Yet another advantage of the present invention is that very little physical strength is required to assemble the photographic lighting dome.

Still another advantage of the present invention is that the retaining tabs allow a controlled application and release of spring tension to the support rods, allowing for improved control.

A yet further advantage of the present invention is that the present invention is mush safer to use, due to the increased control of spring tension in the rods, and the inclusion of safety tips on the rods.

An additional advantage of the present invention is that the rods are completely reversible, which allows for high-speed assembly, relative to prior art lighting boxes.

These and other objects and advantages of the present invention will become clear to those skilled in the art in view of the description of the best presently known mode of carrying out the invention and the industrial applicability of the preferred embodiment as described herein and as illustrated in the several figures of the drawings.

BEST MODE FOR CARRYING OUT THE INVENTION

A preferred embodiment of the present invention is a photographic softbox in the form of a light dome particularly adapted for rapid assembly.

Figure 1:
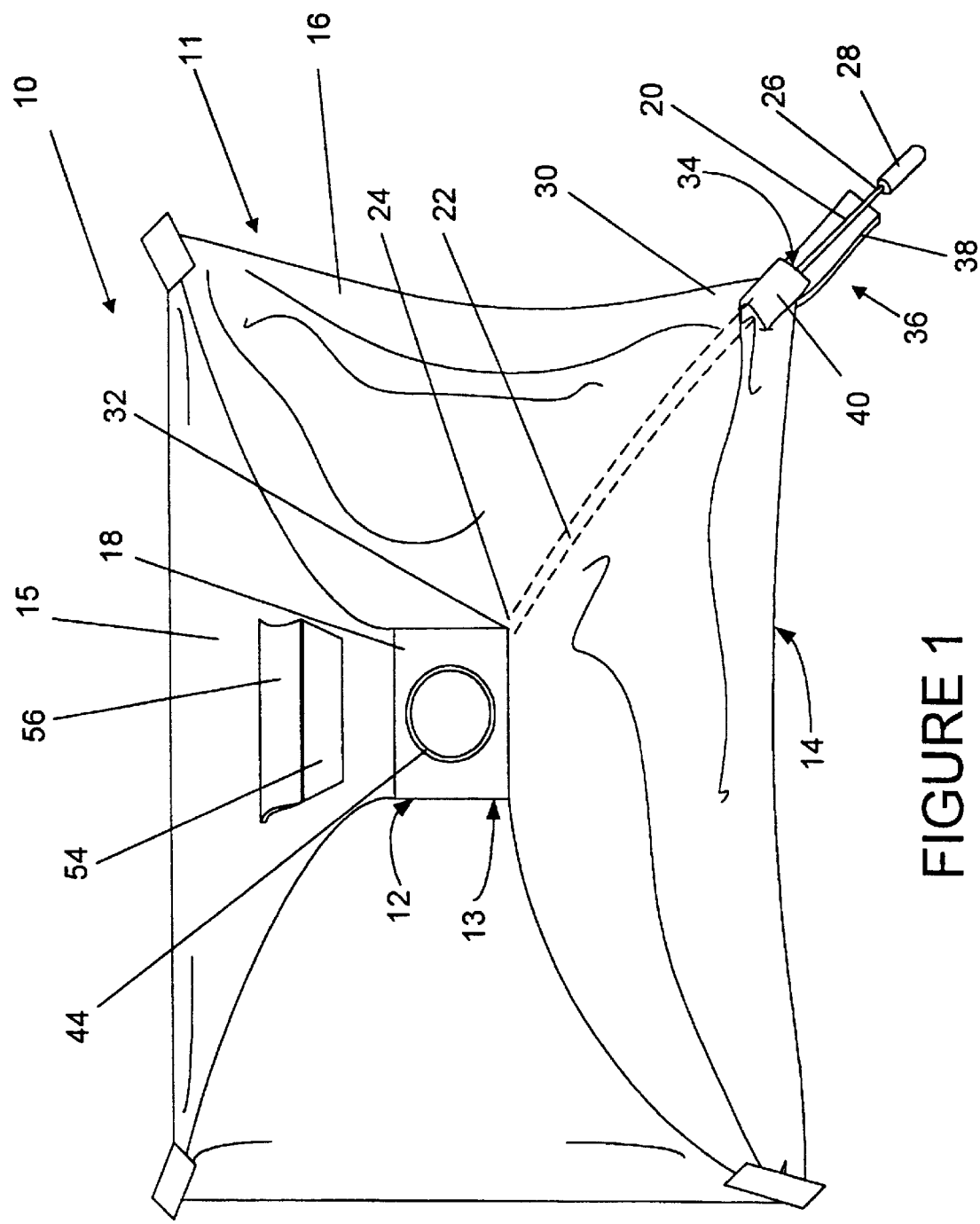
FIG. 1 is a top plan view of the improved dome structure for rapid assembly of the present invention.

As illustrated in the various drawings herein, and particularly in the view of FIG. 1, a form of this preferred embodiment of the inventive device is depicted by the general reference character 10.

FIG. 1 illustrates the light dome 10 including a housing 11 having an inner perimeter 12 which surrounds a central opening 13. The housing 11 also has an outer perimeter 14. In this embodiment, the housing 11 has two long sides 15 and two short sides 16 to produce a rectangular field of illumination. This allows the dome 10 to be oriented with a long side 15 turned horizontally for illumination of "landscape" style field of view, or to have a short side 16 oriented horizontally for "portrait" style images. It should be understood, however that the dome could be made with four equal sides to make a square structure, or it could have fewer sides, such as three, or more sides such as five, six or eight, etc. The dome 10 further has a central hub 18 positioned within the central opening 12, and a plurality of support rods 20. The support rods 20 are enclosed in seams or channels 22 (only one is shown in the figure) provided in the edges of the housing 11, and are made to slide within the channels 22 so that they may be easily inserted or removed from the channels 22. The support rods 20 are fungible and are formed of material such as flexible metal or fiberglass and have a connecting end 24 which will engage the central hub 18, and a releasable end 26 which is covered with a protective foot 28. The channels 22 of the housing 11 are open at both ends, with one opening near the central hub 18, and one at a corner of the housing 30. For ease of reference, these shall be called the center opening 32 and the perimeter opening 34, respectively. It should be understood that it is possible to practice the present invention where there is no center opening in the channel, so that the support rod connecting end is stopped from further axial movement by a blind end to the channel. These blind ends could be near the central opening, but not connecting to it, and could act as an alternative to connecting to a central hub.

Each housing corner 30 has a securing assembly 36 which includes a retaining tab 38 and a fastener 40. In this version of the preferred embodiment, the retaining tab 38 and fastener 40 are a hook and eye mechanism such as Velcro™, but it should be understood that many other varieties of fasteners, such as buttons, snaps, zippers and latches, among others, may be used to secure the retaining tab 38 to the fastener 40. It should also be understood that if Velcro™ is use either the hook or the eye portion of the Velcro™ fastener may be placed on the retaining tab 38 to engage the corresponding eye or hook portion on the fastener 40. Similarly, the placement of other fasteners may be similarly reversed, for example a button may be on either the retaining tab 38 or the fastener 40 to cooperate with a corresponding buttonhole.

Figure 2:
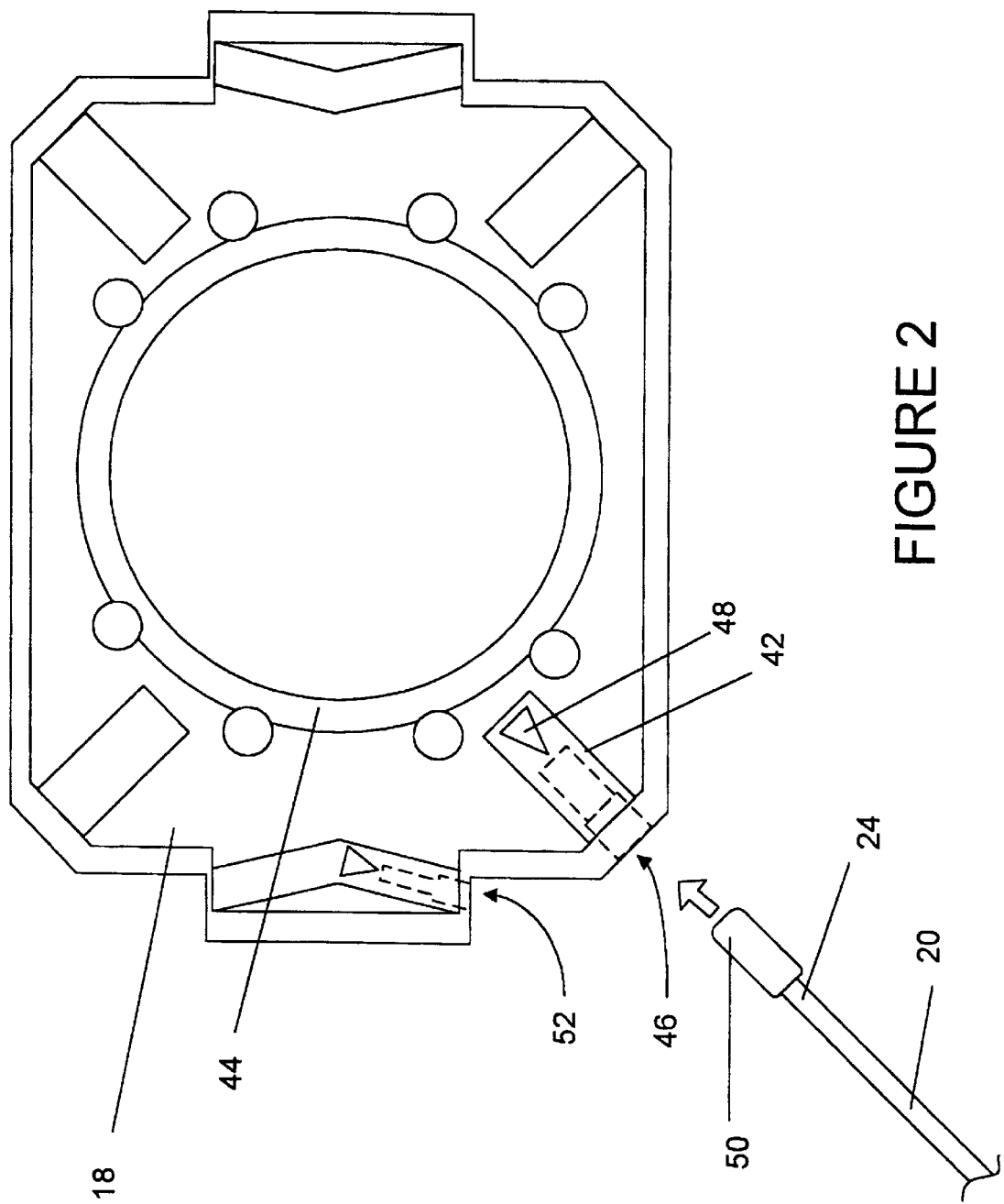
FIG. 2 is a top plan view of the central hub, with all connecting rods and the housing removed.

FIG. 2 shows the central hub 18 with the housing and the support rods removed. The central hub 18 includes a plurality of rod attachment fixtures 42, which in this version of the preferred embodiment are unthreaded insertion sockets 46, but which could be a number of other mechanisms, such as clamps, retaining pins, screws or threaded sockets into which support rods 20 with tapped screws threads may be fixed. The central hub 18, in this version of the preferred embodiment is basically a rectangle and the attachment fixtures 42 are located at the four corners of the central hub 18. This version of the preferred embodiment also has been formed with one of the insertion sockets 46 of the attachment fixture 42 having a portion with a slightly larger diameter near its opening. This aids in assembly of the light dome 10, by providing a larger aperture for insertion of the rod 20, thus making the approach angle for inserting the support rod 20 less limited. This insertion socket 46 with the enlarged aperture is marked with an identifying symbol 48. The connecting end 24 of the support rod 20 is provided with a cap 50 which is appropriately sized for proper fit in the insertion socket 46. This also has the advantage of providing safety protection from unblunted edges of the underlying support rod 20 connecting end 24. It should be understood that the use of these caps is optional and the invention can be practiced using rods 20 of suitable diameter without these caps, and also without the protective feet 28 at the releasable end 26 of the rods 20.

This version of the preferred embodiment also has an alternate set of connecting sockets 52 which can be used to support alternate housings or the standard housing 11 in an alternate manner.

Referring now to both FIGS. 1 and 2, assembly can be performed by inserting the connecting end 24 of the rod 20 with its end cap 50 into the channel corner opening 34 of a channel 22 of the housing 11, and sliding it in the channel 22 until the rod's connecting end 24 emerges from the center opening 32 of the channel 22. Alternately, the releasable end 26 of the rod 20 with its protective foot 28 can be inserted into the center opening 32 of a channel 22 and the rod 20 pushed until the foot 28 emerges from the perimeter opening 34 of the channel 22. This is repeated for the other rods 20 until all have been inserted. The rod end caps 50 of the connecting ends 24 of the rods 20 are then inserted into the insertion sockets 46 of the rod attachment fixtures 42. The releasable ends 26 of the rods 20 thus protrude from the corners 30 of the housing 11. Pressure is then applied to the releasable ends 26 in an axial direction to force the rods 20 into the channels 22, causing them to bow in conformance to the arcs defined by the channels 22 within the housing 11 shape. When a releasable end 26 has been pushed into the corner opening 34 of a channel 22, the retaining tab 38 of the securing assembly 36 is pulled up to engage the fastener 40. This is repeated with the other support rods 20 to complete assembly of the housing 11. Alternately, the rod 20 can be pushed into the channel 22 just far enough that the foot 28 contacts a portion of the retaining tab 38. The tab 38 can then be pulled up to engage the fastener 40, at the same time acting as a small pulley to force the rod's releasable end 26 completely into the channel corner opening 34.

Disassembly can be done by reversing the above steps, starting with disengaging one of the retaining tabs 38 from its corresponding fastener 40 to allow the rod 20 to straighten.

Alternatively, assembly can be done by fastening the releasable ends 26 of the rods 20 in the corners 30 first, and then inserting the rod connecting ends 24 into the insertion sockets 46 of the attachment fixtures 42, in effect using the method required by the prior art. Comparing this prior method with the improved method made possible by the present invention makes it clear the advantage which the present invention holds. If, however, the prior method is to be used, the present invention also allows an improvement in assembly which is accomplished by inserting the rod connecting end 24 into the insertion socket 46 marked with the identifying symbol 48 as the last connection, which typically requires the most force and skill in alignment. The enlarged aperture of the marked insertion socket 46 makes alignment easier to accomplish. Conversely, for disassembly, the marked socket 46 should be disengaged from its respective rod 20 first, as the enlarged aperture allows less force to be exerted on the rod 20 and removal alignment is also less critical.

The central hub further includes a light source attachment fixture 44 with a variety of mounting points to which a light source (not shown) can be attached.

Referring again to FIG. 1, the housing 11 also has a plurality of ventilation ports 54 which are covered by reclosable flaps 56. These ventilation ports 54 can be opened to allow cooling air from the base to flow in a chimney-like fashion which aids in cooling the light source.

Although not shown in the figures, it should be understood that the present lighting dome 10 also includes one or more light deflecting or transmitting parcels or screens which serve to diffuse light from the light source in a standard manner.

In addition to the above mentioned examples, various other modifications and alterations of the inventive device 10 may be made without departing from the invention.

INDUSTRIAL APPLICABILITY

The present photographic lighting dome 10 is well suited for providing diffused lighting for photographic purposes. The inventor anticipates that primary application of the present invention will be for location filming and lighting for mobile broadcast journalism. However, the present invention is also well suited to sue in studio photography and in broadcast media studios.

Collapsible lighting domes which are covered with cloth are also known as "softboxes". They are generally made to be collapsible into compact bundles which are easily portable for photographic purposes in field locations. Because they are so portable, their use by camera crews has increased dramatically in recent years. News camera crews are known for their competitiveness in covering newsworthy events, and the competitive edge of a crew depends on being able to respond quickly to breaking events. Thus any advance which can speed the set-up time required for assembling photographic equipment can be of immense value in the race to cover a news story. The present invention 10 speeds the set-up time by presenting a softbox which is much quicker and easier to assemble.

Assembly can be performed by inserting the connecting end 24 of the rod 20 with its end cap 50 into the channel corner opening 34 of a channel 22 of the housing 11, and sliding it in the channel 22 until the rod's connecting end 24 emerges from the center opening 32 of the channel 22. Alternately, the releasable end 26 of the rod 20 with its protective foot 28 can be inserted into the center opening 32 of a channel 22 and the rod 20 pushed until the foot 28 emerges from the corner opening 34 of the channel 22. This is repeated for the other rods 20 until all have been inserted. The rod end caps 50 of the connecting ends 24 of the rods 20 are then inserted into the insertion sockets 46 of the rod attachment fixtures 42. The releasable ends 26 of the rods 20 thus protrude from the corners 30 of the housing 11. Pressure is then applied to the releasable ends 16 in an axial direction to force the rods 20 into the channels 22, causing them to bow in conformance to the arcs defined by the channels 22. within the housing 12 shape. When a releasable end 26 has been pushed into the corner opening 34 of a channel 22, the retaining tab 38 of the securing assembly 36 is pulled up to engage the fastener 40. This is repeated with the other support rods 20 to complete assembly of the housing 11. Alternately, the rod 20 can be pushed into the channel 22 just far enough that the foot 28 contacts a portion of the retaining tab 38. The tab 38 can then be pulled up to engage the fastener 40, at the same time acting as a small lever to push the rod's releasable end 26 completely into the channel corner opening 34.

Disassembly can be done by reversing the above steps, starting with disengaging one of the retaining tabs 38 from its corresponding fastener 40 to allow the rod 20 to straighten.

Prior art softboxes typically require that the central end of the rod be directed into a hole in the central hub while the rods are under axial compression. The holes are generally of small diameter and require that the rods enter within a small range of approach angles, which can be rather like threading a needle while simultaneously compressing a spring. If this springy rod with a typically unblunted edge snaps out straight, this can cause damage to hands, wrists or eyes as the rod can be expected to straighten with considerable force.

In contrast, the present invention 10 is not only quicker to assemble, but it also requires less physical strength and fine coordination. The connecting ends 24 of the support rods 20 are inserted into the hub 18 first, while there is no tension in the rods 20, and the corner ends 34 of the housing 11 only require that the retaining tabs 38 be pulled up to meet the fasteners 40. Additionally, as stated above, the retaining tabs 38 can be used to provide leverage. The present invention 10 is thus much safer to use, as well as being faster and easier to assemble. This enhanced safety makes the present invention also advantageous for uses in which speed of assembly is not crucial, such as in photographic studios, broadcast studios and even for home photography.

For the above and other reasons, it is expected that the rapid assembly photographic lighting dome 10 of the present invention will have widespread industrial applicability. Therefore, it is expected that the commercial utility of the present invention will be extensive and long lasting.

What is claimed is:

1. A photographic lighting dome for holding and directing a light source comprising:
   a housing of flexible material, said housing having an inner perimeter surrounding a central opening, and an outer perimeter;
   a plurality of flexible support rods, each support rod having a connecting end and a releasable end;
   a central hub positioned in said central opening of said housing, said hub having a plurality of support rod attachment fixtures, each fixture configured for receiving the connecting end of one of said plurality of support rods;
   a plurality of channels formed in said housing, extending from said housing central opening to said outer perimeter of said housing, each said channel being shaped to receive one of said plurality of support rods;
   each channel further having two ends and an opening at each of said ends, said channel having, a central channel opening, said connecting end of said support rod passing therethrough for attachment to said central hub, and an outer perimeter opening, through which said releasable end of said support rod may pass; and
   a plurality of retaining means positioned proximate to said housing perimeter for releasably capturing and maintaining axial force in each of said support rods in each of said channels, said retaining means being releasable to allow said releasable ends of said support rods to escape confinement in said channels through said outer perimeter openings of said channels.

2. A photographic lighting dome as in claim 1 wherein said retaining means is selected from a group consisting of hook and eye fasteners, buttons and holes, snaps, mechanical latches, zippers and Velcro/™.

3. A photographic lighting dome as in claim 1 wherein said housing has a plurality of sides to produce a polygonal field of illumination.

4. A photographic lighting dome as in claim 3 wherein said housing has two long and two short sides to produce a rectangular field of illumination.

5. A photographic lighting dome as in claim 1 wherein at least one of said central hub rod attachment fixtures includes an enlarged aperture for easy insertion of said connecting end of said support rod.

6. A photographic lighting dome as in claim 5 wherein said fixture containing said enlarged aperture is identified by an indicator.

7. A photographic lighting dome as in claim 1 wherein said central hub has at least one alternate set of attachment fixtures which allow said housing to be assembled in an alternative configuration to produce two or more alternate fields of illumination.

8. A photographic lighting dome as in claim 1 wherein said support rods are composed of a material selected from the group consisting of fiberglass, aluminum and steel.

9. A photographic lighting dome as in claim 1 wherein said support rods each have safety caps on each of said ends.

10. A photographic lighting dome as in claim 1 wherein said housing includes ventilation ports.

11. A photographic lighting dome for holding and directing a light source comprising:
    a housing having a plurality of sides, an inner perimeter and an outer perimeter;
    a plurality of support members coupled to said housing such that when axial force is applied to said support members, said support members urge said plurality of housing walls to expand away from each other, said support members each having a releasable end proximate to said housing outer perimeter and a connecting end; and
    a plurality of retaining means positioned proximate to said releasable ends of said support members for releasably capturing said support members and maintaining axial force in said support members, said retaining means being releasable to allow said releasable ends of said support members to escape confinement from proximate to said outer perimeter of said housing.

12. A photographic lighting dome as in claim 11 further comprising:
    a central hub having a plurality of attachment fixtures, each fixture configured for receiving the connecting end of one of said plurality of support members.

13. A photographic lighting dome as in claim 11 wherein said retaining means is selected from a group consisting of hook and eye fasteners, buttons and holes, snaps, mechanical latches, zippers and Velcro/™.

14. A photographic lighting dome as in claim 11 wherein said housing has two long and two short sides to produce a rectangular field of illumination.

15. A photographic lighting dome as in claim 11 wherein at least one of said central hub rod attachment fixtures includes an enlarged aperture for easy insertion of said connecting ends of said support members.

16. A photographic lighting dome as in claim 15 wherein said fixture containing said enlarged aperture is identified by an indicator.

17. A photographic lighting dome as in claim 11 wherein said central hub has at least one alternate set of attachment fixtures which allow said housing to be assembled in an alternative configuration to produce two or more alternate fields of illumination.

18. A photographic lighting dome as in claim 11 wherein said support members have safety caps on each of said releasable ends.

19. A method of assembling and disassembling a photographic lighting dome comprising the steps of:
    (A) providing a housing having a plurality of walls, an inner perimeter, and an outer perimeter, a plurality of support members, said support members each having a releasable end and a connecting end, said housing further having a plurality of channels for receiving said support members, each channel having an opening proximate said outer perimeter and a defined shape, and a plurality of retaining means, each retaining means positioned proximate to one of said openings of said channels;
    (B) inserting said one of said connecting ends of said support members into one of said openings of said channels, and pushing said support members into said channel until said connecting ends reaches a stop and said releasable end is proximate to said retaining means;
    (C) applying axial force to said support member causing it to bow in conformance with the shape of said channel and thus urge said housing to expand into a dome shape;

(D) fastening said retaining means to capture said releasable end of said support member and maintain axial force in said support member;

(E) repeating steps B through D for each of said support members until all have been captured to complete assembly of said photographic lighting dome; and (F) relieving axial force in said support members by releasing said retaining means and allowing said releasable ends of said support members to escape confinement in said channels through said channel openings proximate to said housing outer perimeter in a controllable manner, in order to disassemble said photographic lighting dome.

20. A method of assembling and disassembling a photographic lighting dome of claim 19, wherein said housing has an inner perimeter surrounding a central opening, a central hub having a plurality of attachment fixtures is positioned within said central opening, said support members each have a connecting end, and said channels each have an opening proximate said housing central opening, step (B) further comprises:

(a) inserting said connecting end of each of said support members into said attachment fixtures in said central hub.

\* \* \* \* \*

UNITED STATES PATENT AND TRADEMARK OFFICE
CERTIFICATE OF CORRECTION

PATENT NO.   : 6,076,935
DATED        : June 20, 2000
INVENTOR(S)  : Eugene A. Kester It is certified that error appears in the above-identified patent and that said Letters Patent is hereby corrected as shown below:

Column 3, line 13: replace "mush" with --much--;
Column 3, line 56: replace "central opening 12" with --central opening 13--;
Column 4, line 17: replace "use" with --used--;
Column 5, line 50: replace "parcels" with --panels--;
Column 5, line 63: replace "sue" with --use--;
Column 6, line 25: replace "releasable ends 16" with --releasable ends 26--;
Column 8, line 31: replace "as in claim 11" with --as in claim 12--;
Column 8, line 38: replace "as in claim 11" with --as in claim 12--.

Signed and Sealed this

Eighth Day of May, 2001

NICHOLAS P. GODICI

Attest:

Attesting Officer

Acting Director of the United States Patent and Trademark Office

(12) EX PARTE REEXAMINATION CERTIFICATE (7773rd)
United States Patent
Kester

(10) Number: US 6,076,935 C1
(45) Certificate Issued: Sep. 28, 2010

(54) RAPID ASSEMBLY PHOTOGRAPHIC LIGHTING DOME

(75) Inventor: Eugene A. Kester, Santa Cruz, CA (US)

(73) Assignee: Photoflex, Inc., Watsonville, CA (US)

Reexamination Request:
No. 90/007,943, Feb. 17, 2006

Reexamination Certificate for:
Patent No.: 6,076,935
Issued: Jun. 20, 2000
Appl. No.: 09/214,685
Filed: Jan. 8, 1999

Certificate of Correction issued May 8, 2001.

(22) PCT Filed: Jun. 3, 1998

(86) PCT No.: PCT/US98/11443
§ 371 (c)(1),
(2), (4) Date: Jan. 8, 1999

(87) PCT Pub. No.: WO98/55898
PCT Pub. Date: Dec. 10, 1998

(51) Int. Cl.
*G03B 15/06* (2006.01)
*G03B 15/02* (2006.01)

(52) U.S. Cl. .............. 362/16; 362/17; 362/18; 362/278; 362/3; 362/320; 362/352; 362/360; 362/370; 362/371

(58) Field of Classification Search .............. 362/7, 362/16, 17, 18
See application file for complete search history.

(56) References Cited

U.S. PATENT DOCUMENTS 3,781,535 A    12/1973   Larson
4,052,607 A    10/1977   Larson
4,347,862 A  *  9/1982   Secon ................ 135/20.1
4,563,969 A     1/1986   Le Bail
4,807,089 A     2/1989   Nussli
4,931,120 A  *  6/1990   Christoff ............ 156/153
5,131,609 A     7/1992   Prouty

FOREIGN PATENT DOCUMENTS

GB          2 211 243 A  *  6/1989

\* cited by examiner

*Primary Examiner*—Christina Y Leung

(57) ABSTRACT

A photographic lighting dome (10) for holding and directing a light source having a housing (11) of flexible material, the housing (11) having an inner perimeter (12) surrounding a central opening (13), and an outer perimeter (14). There are a plurality of flexible support rods (20), each support rod (20) having a connecting end (24) and a releasable end (26). A central hub (18) having a plurality of support rod attachment fixtures (42) is positioned in the central opening (13) of the housing (11), where each fixture (42) is configured for receiving the connecting end (24) of one of the plurality of support rods (20). A plurality of channels (22) are formed in the housing (11), extending from the housing central opening (13) to the outer perimeter of the housing (14), each channel (22) being shaped to receive one of the plurality of support rods (20). Each channel (22) further has a central channel opening (32), the connecting end (24) of a support rod (20) passing therethrough for attachment to the central hub (18), and an outer perimeter opening (34), through which the releasable end (26) of the support rod (20) may pass. A plurality of retaining means (36) are positioned proximate to the housing outer perimeter (14) for releasably capturing and maintaining axial force in each of said support rods (20) in each of the channels (22) to urge the housing (11) into a dome shape.

A method of assembling and disassembling the photographic dome (10) is also disclosed.

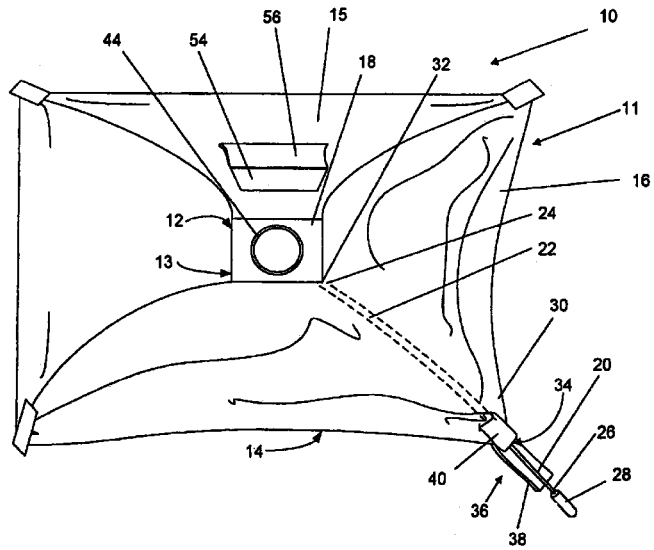

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-10, 19 and 20 is confirmed.

Claims 11 and 13 are determined to be patentable as amended.

Claims 12 and 14-18, dependent on an amended claim, are determined to be patentable.

11. A photographic lighting dome for holding and directing a light source comprising:

a housing having a plurality of sides, an inner perimeter and an outer perimeter;

a plurality of support members coupled to said housing such that when axial force is applied to said support members, said suport members urge said plurality of housing [walls] *sides* to expand away from each other, said support members each having a releasable and proximate to said housing outer perimeter and a connecting end; and a plurality of retaining [means] *housing corners formed in said housing perimeter and* positioned proximate to said releasable ends of said support members, *said housing corners having corner openings with associated retaining fasteners* for releasably capturing said support members and maintaining axial force in said support members.

13. A photographic lighting dome as in claim 11 wherein said retaining [means is] *fasteners are* selected from a group consisting of hook and eye fasteners, buttons and holes, snaps, mechanical latches, zippers and Velcro™.

\* \* \* \* \*